US009436357B2

(12) United States Patent
Pallakoff et al.

(10) Patent No.: US 9,436,357 B2
(45) Date of Patent: Sep. 6, 2016

(54) SYSTEM AND METHOD FOR CREATING AND VIEWING COMIC BOOK ELECTRONIC PUBLICATIONS

(71) Applicant: barnesandnoble.com llc, New York, NY (US)

(72) Inventors: Matthew Pallakoff, Mountain View, CA (US); Luis Daniel Mosquera, Foster City, CA (US)

(73) Assignee: NOOK DIGITAL, LLC, New York, NY (US)

( * ) Notice: Subject to any disclaimer, the term of this patent is extended or adjusted under 35 U.S.C. 154(b) by 451 days.

(21) Appl. No.: 13/791,689

(22) Filed: Mar. 8, 2013

(65) Prior Publication Data

US 2014/0258911 A1   Sep. 11, 2014

(51) Int. Cl.
*G06F 3/0484* (2013.01)
*G06F 3/0483* (2013.01)
*G06T 11/60* (2006.01)

(52) U.S. Cl.
CPC ......... *G06F 3/0483* (2013.01); *G06F 3/04842* (2013.01); *G06T 11/60* (2013.01)

(58) Field of Classification Search
CPC .................................................. G06F 3/04842
See application file for complete search history.

(56) References Cited

U.S. PATENT DOCUMENTS

| | | | | |
|---|---|---|---|---|
| 5,428,733 | A * | 6/1995 | Carr .............................. | 715/809 |
| 6,072,476 | A * | 6/2000 | Harada et al. ................ | 345/204 |
| 6,157,733 | A * | 12/2000 | Swain ............................ | 382/154 |
| 6,606,105 | B1 * | 8/2003 | Quartetti ....................... | 715/853 |
| 6,704,034 | B1 * | 3/2004 | Rodriguez et al. ........... | 715/860 |
| 6,760,048 | B1 * | 7/2004 | Bates et al. ................... | 715/797 |
| 7,434,177 | B1 * | 10/2008 | Ording et al. ................ | 715/862 |
| 2002/0083101 | A1 * | 6/2002 | Card et al. .................... | 707/526 |
| 2002/0122039 | A1 * | 9/2002 | Minagawa et al. ........... | 345/473 |
| 2003/0179234 | A1 * | 9/2003 | Nelson et al. ................ | 345/764 |
| 2004/0021673 | A1 * | 2/2004 | Alessi et al. ................. | 345/619 |
| 2004/0064498 | A1 * | 4/2004 | Imanishi ....................... | 709/201 |
| 2004/0263515 | A1 * | 12/2004 | Balsiger et al. .............. | 345/441 |
| 2005/0005245 | A1 * | 1/2005 | Card et al. .................... | 715/776 |
| 2005/0015730 | A1 * | 1/2005 | Gunturi et al. ............... | 715/777 |
| 2005/0039138 | A1 * | 2/2005 | Urbina .......................... | 715/802 |
| 2006/0242603 | A1 * | 10/2006 | Wong et al. .................. | 715/853 |
| 2007/0126732 | A1 * | 6/2007 | Robertson et al. ........... | 345/419 |
| 2007/0209025 | A1 * | 9/2007 | Jing et al. ..................... | 715/968 |
| 2007/0233385 | A1 * | 10/2007 | Dicke et al. .................. | 701/215 |
| 2007/0266319 | A1 * | 11/2007 | Matsuo ......................... | 715/700 |
| 2008/0136785 | A1 * | 6/2008 | Baudisch et al. ............. | 345/173 |

(Continued)

OTHER PUBLICATIONS

Bederson, "Fisheye Menus," May 2000, Proc. UIST 2000 pp. 217-225, http://www.cs.umd.edu/local-cgi-bin/hcil/rr.pl?number=2000-12.*

*Primary Examiner* — Ryan Barrett
(74) *Attorney, Agent, or Firm* — Winston & Strawn LLP

(57) ABSTRACT

A system and method for enhancing electronic comic book reading by dynamically expanding text bubbles ("bubbles") to make them easier to read, especially on a small mobile device. The methods include skimming a sequence of expanded bubbles, flinging through a sequence of expanded bubbles and positioning expanded bubbles so as not to hide the comic character(s) uttering the phrase. The methods are performed with irregular bubble outlines (like curly, bumpy, or jagged text bubbles commonly found in comics). Further the method includes pre-processing the content in an automated fashion to enable skimming and flinging through the sequences of expanded bubbles.

9 Claims, 12 Drawing Sheets

(56) References Cited

U.S. PATENT DOCUMENTS

| | | | |
|---|---|---|---|
| 2008/0253757 A1* | 10/2008 | Bells et al. | 396/77 |
| 2009/0222420 A1* | 9/2009 | Hirata | 707/3 |
| 2010/0031176 A1* | 2/2010 | Song | 715/767 |
| 2010/0156806 A1* | 6/2010 | Stallings | 345/173 |
| 2010/0315315 A1* | 12/2010 | Osborne | 345/1.3 |
| 2011/0074831 A1* | 3/2011 | Lynch et al. | 345/682 |
| 2011/0148917 A1* | 6/2011 | Alberth et al. | 345/629 |
| 2011/0209099 A1* | 8/2011 | Hinckley et al. | 715/863 |
| 2011/0310104 A1* | 12/2011 | Dicke | 345/473 |
| 2012/0030569 A1* | 2/2012 | Migos et al. | 715/702 |
| 2012/0066638 A1* | 3/2012 | Ohri | 715/784 |
| 2012/0124505 A1* | 5/2012 | St. Jacques, Jr. | 715/776 |
| 2012/0240074 A1* | 9/2012 | Migos et al. | 715/776 |
| 2012/0240075 A1* | 9/2012 | Kim | G06F 3/0481 715/776 |
| 2012/0268409 A1* | 10/2012 | Soo et al. | 345/173 |
| 2013/0100161 A1* | 4/2013 | Nonaka | 345/629 |
| 2013/0152011 A1* | 6/2013 | Pallakoff et al. | 715/784 |
| 2013/0283157 A1* | 10/2013 | Ebata | 715/265 |
| 2013/0326341 A1* | 12/2013 | Nonaka | 715/246 |
| 2015/0242061 A1* | 8/2015 | Patel | G06F 3/017 715/765 |

* cited by examiner

SYSTEM AND METHOD FOR CREATING AND VIEWING COMIC BOOK ELECTRONIC PUBLICATIONS

FIELD OF THE INVENTION

The present invention generally relates to digital publications, and more particularly to systems and methods for creating and viewing graphic digital publications.

BACKGROUND OF THE INVENTION

A comic book is a magazine that contains narrative artwork usually accompanied by dialog (e.g., word balloons). Normally, comic books are a series of panels explaining a portion of the over all story. Several panels could appear on the same page, and coupled with other pages, tell the story.

Comic books have been around for some time and are well known in the art. Traditional comic books appear in printed hard copy format. Many of these titles are highly coveted for their scarcity or other collectible reasons (e.g., misprints, subject matter, etc.). However, the traditional printed format has experienced considerable decline.

With the advent of electronic and digital media, demand has grown for alternate format comic books. Existing digital "readers" struggle to provide a mobile solution that integrates the look and feel of a traditional printed comic book. Unfortunately, much of the desire and nostalgia rests in the physical look and flow of the comic book which existing digital readers have difficulty replicating. Particularly, navigation through the digital comic book can be difficult.

These and other deficiencies have left comic book aficionados without an acceptable, mobile, hand-held, electronic comic book platform that retains both the highly sought after physical characteristics and flow of traditional printed comic books.

SUMMARY OF THE INVENTION

The present invention enhances electronic comic book reading by dynamically expanding text bubbles ("bubbles") to make them easier to read, especially on a small mobile device. Several methods are described for facilitating the reading of text bubbles, including: skimming a sequence of expanded bubbles; flinging through a sequence of expanded bubbles; positioning expanded bubbles so as not to hide the comic character(s) uttering the phrase; performing the above methods with irregular bubble outlines (like curly, bumpy, or jagged text bubbles commonly found in comics); and a method of pre-processing the content in an automated fashion to enable skimming and flinging through the sequences of expanded bubbles as described in the areas outlined above.

The present invention represents entirely new ways of processing, displaying, and interacting with comic text bubbles that dramatically improves the overall user experience for comic readers. Some of these techniques can also be used to enhance reading and interacting with other types of content on tablets especially when that content contains many bits of text and images spread around a page, such as catalogs.

BRIEF DESCRIPTION OF THE DRAWINGS

For the purposes of illustrating the present invention, there is shown in the drawings a form which is presently preferred, it being understood however, that the invention is not limited to the precise form shown by the drawing in which.

DETAILED DESCRIPTION OF THE INVENTION

The present invention was developed with a goal of improving the comic book reading experience. Although comic illustrations are easy to read on moderate size displays, text in text bubbles uttered by characters throughout comic book content appear can appear very small and sometimes difficult to read when viewed on other, relatively small displays, such as the display of many smartphones. Although the present specification uses the term "bubbles" for the shapes that enclose the text in a comic illustration, it is appreciated that this term is synonymous with other terms such as balloons. Further, there is a distinction in the comic illustration art between thought bubbles and speech bubbles. As appreciated by those skilled in the art, the systems and methods as described herein apply equally to any such shape, regardless of the terminology used to describe it.

Other comic book reading software attempted to compensate for the small text by zooming in and out of subsections ("panels") within each illustration. However this method tends to feel disorienting and disjointed to the user, especially on pages where the panels vary widely in size or where panels aren't well defined. Using panel zooming alone, makes it hard for the reader to appreciate the story line in the context of the overall page composition—something in which comic artists invest a great deal of time, effort, and expertise.

The present invention solves these problems by allowing users to effortlessly expand each text bubble in sequence, without having to zoom the size of the overall illustration. This allows users to more comfortably read text bubbles without losing the ability to see the entire composition of the illustration.

The invention allows a user to read a page of comic book bubbles by swiping (also known as "sliding" or "skimming") their finger along a portion of the touch screen to dynamically expand and shrink (or open and close) bubbles, in sequence. The concept allows a user to quickly scan and/or fully read comic bubbles while barely lifting a finger.

Figure 1:
FIG. 1 illustrates a page of an electronic comic book, as displayed on a screen of an electronic device.

FIG. 1 illustrates a single comic book page 100, as displayed on a screen of an electronic device, such as a tablet. As further explained below, the tablet is preferably equipped with a touch screen. As shown in FIG. 1, the text in bubbles 110 is approximately the same size as the text in all of the other bubbles appearing on this page. The bubble 110 delineates the text from the remainder of the illustration on the page/in the panel. Although the bubble 110 does not necessarily have to have a defined border such as a line, it typically will be of a lighter color, e.g., white to help set off the text from the illustration. To invoke the bubble navigation feature in the illustrated embodiment of the present invention, the user swipes her finger from the top of the right side of the touch screen to the bottom.

Figure 2:
FIG. 2 depicts a navigation bar to assist in the swiping gesture for expanding and contracting text bubbles.

As shown in FIG. 2, as the user performs this swiping gesture, a navigation bar 120 appears on the right hand side of the screen. As the user swipes down the bar 120 (not lifting her finger), the top left most bubble expands in a smooth animated fashion. Then, as the user continues skimming down the bar 120, the next bubble in sequence will begin to open (expand) as the previous one begins to close (contract to original size). As shown in FIG. 2, the user has navigated down the bar to the point where bubbles 110 are expanded.

This process of expanding and contracting bubbles repeats with other bubbles opening and closing in sequence as the user continues swiping on the bar 120 until the bottom of the screen is reached. In one embodiment, when the user lifts her finger, the last bubble expanded (if any) remains expanded, or if two bubbles are shown in various states of zoom, the larger bubble is fully expanded and the other is closed. The expanded bubble is the current reading location in the sequence of text bubbles.

It is not required that the user be able to open and close all of the bubbles on a single page with one swipe from top to bottom. The distance the user's finger must travel between open bubbles can be varied. In a preferred embodiment, this distance is set to approximately 0.75 inches of screen space between fully expanded bubbles. The user can stop skimming at any time and lift her finger. As described above, the last expanded bubble is the current reading position, so the user can begin the skimming motion again where she left off. Only the relative motion of the finger matters, i.e., distance moved, not absolute position on the bar 120. The user can skim up and down without restriction while her finger is touching the screen. The user may also skim down through a bubble or two, lift her finger and place it back down higher on the screen, and proceed to skim through additional bubbles.

In the preferred embodiment, the navigation bar 120 is positioned in areas along the edges of the display (either a vertical edge or a horizontal edge). This is particularly preferred on devices with displays with bevels that the user can feel and slide along. Other embodiments also allow sliding in other areas. For example, one embodiment could respond to any vertical slide or vertical flick anywhere on the display, for progressing through the sequence of expanding the bubbles. This embodiment is acceptable as long as that vertical gesture isn't used for any other purpose in the given context. The process for detecting a "vertical" or "horizontal" slide can accommodate inevitable imperfect motion by users by recognizing a "nearly vertical" or "nearly horizontal" slide as being close enough to vertical or horizontal, respectively As shown in FIG. 2, the region(s) where the user skims with her finger is most preferably formed vertically on either side of the screen, but could just as well occur in a substantially vertical or horizontal mode anywhere on the page 100.

In a further feature, skimming before the first or after the last bubble on a page could turn the page. Or it could simply close the first or last bubble, respectively.

The skimming of the present invention provides the user with way to quickly navigate all bubbles by simply sliding her finger down the side of the page 100. This saves effort and keeps the user's hand out of the way of the content, thus enhancing the reading experience. Note that throughout this description, when the phrases "open" or "close" a bubble is used, this terminology is synonymous with "expand" or "shrink" the bubble.

In a further feature, a user can close any bubble by tapping anywhere outside of the bubble. Further, the user can open any bubble (not just the next or previous one in the sequence) simply by tapping on that other bubble.

Preferred embodiments also support a "fling" gesture, also referred to as a "flick." Similar to skimming, a fling is a momentary flick-like gesture of one's finger (along the same strip 120 or area used for the sliding gesture described above) to expand the next or previous bubble in sequence on the page 100.

When a user is allowed to simply flick to the next bubble, they can hold the device in a comfortable grip with their thumb(s) near the bottom corners, and nearly effortlessly flick through the bubbles—expanding each in sequence, one by one (with the last one shrinking when the next one grows).

Like skimming, flinging before the first or after the last bubble on a page could turn the page, in some embodiments. The region(s) where the user flings with their finger is most preferably allowed vertically on either side of the screen, but could just as well occur in a substantially vertical or horizontal mode anywhere on the page 100.

As with the sliding gesture described above, in preferred embodiments a user can close any bubble by tapping anywhere outside of the bubble, and the user can open any bubble (not just the next or previous one in the sequence) simply by tapping on that other bubble.

Skimming can be done in other regions of the screen. A visual bar or indicator such as bar 120 can appear while the user is skimming and disappear when done. The visual indicator can be displayed prior to skimming to identify skim regions to the user. Skimming can be done horizontally. Flinging can be done in other regions of the screen. A visual cue can be displayed to indicate where to fling versus skim. A visual cue could appear after detecting a fling. Variations on swipe timing (velocity) can be programmed to register as a fling. Alternate ways of animating bubble expansion can be used. These techniques for skimming and flinging through sequences of text bubbles may also be combined with more common comic-book-reading approaches that involve zooming into the page and moving around through zoomed-in panels on the page.

Figure 3:
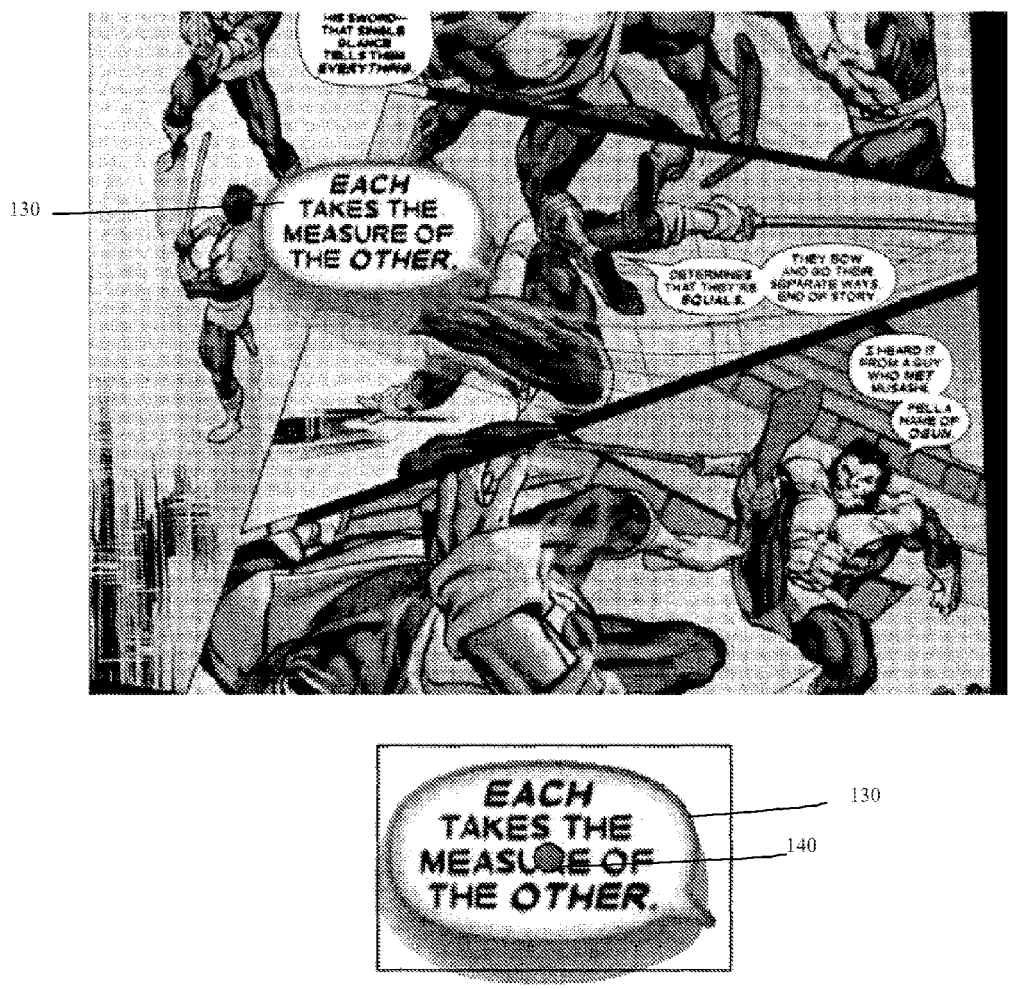
FIG. 3 illustrates covering a character with an expanded dialog bubble.

As shown in FIG. 3, in providing the expanding bubble features of the present invention, a problem can arise in that zoomed bubbles 130 can cover up faces of the characters speaking or cover some equally important part of the illustration on a page 100. This problem can occur if the bubbles are expanded equally from a center "pivot point" 140, where "pivot point" refers to a point in the expanding bubble that stays fixed relative to the larger background image as the bubble grows.

Figure 4:
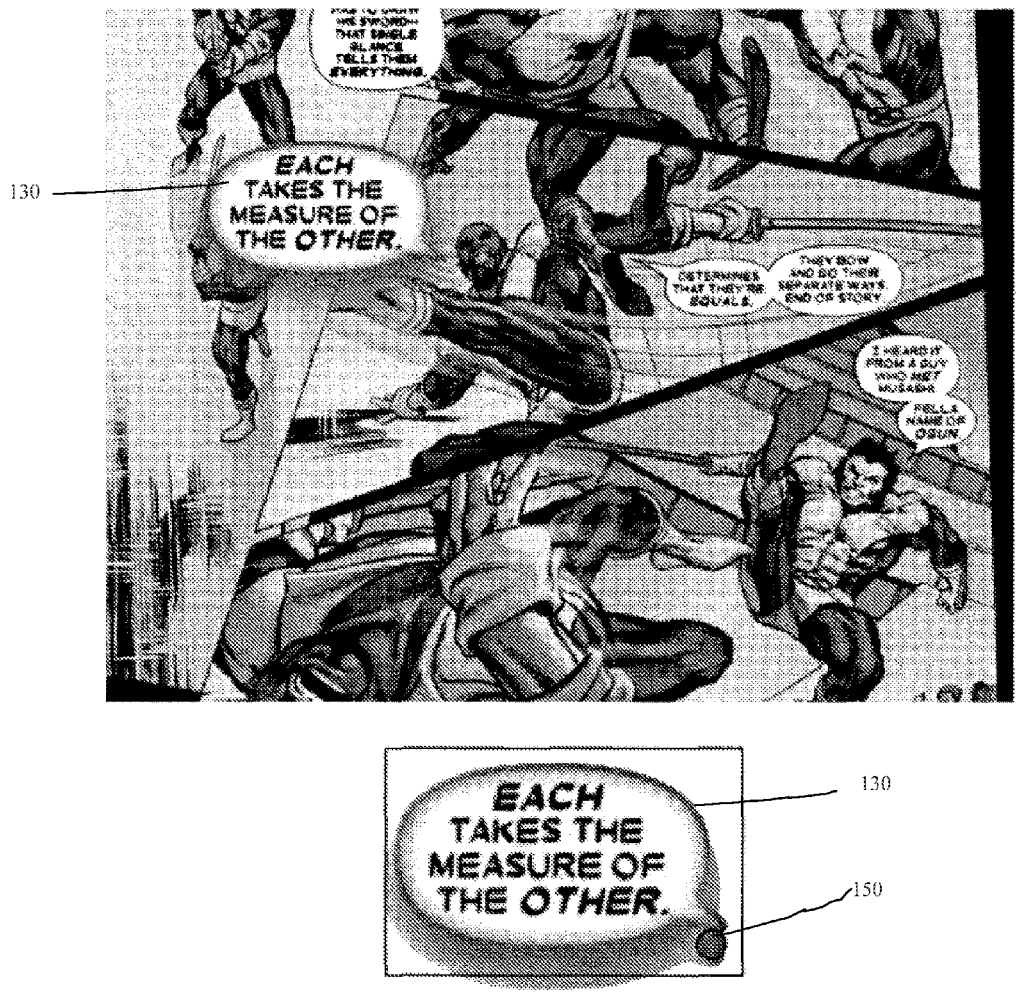
FIG. 4 depicts an alternative positioning of an expanded dialog bubble to avoid obscuring a character.

As shown in FIG. 4, the solution is to move the bubble 130 away from the character to prevent the character from being covered. To accomplish this, a custom pivot point 150 is identified within or relative to the bubble 130 from which the bubble 130 should expand. This point 150 becomes the new pivot point 150 during the animation. The custom pivot point is tailored to each bubble. Care must still be taken in regard the screen boundary so the text of the bubble remains readable. However the identification of a custom pivot point 150 is a significant improvement to simply growing each bubble from its center point.

As illustrated in FIG. 4, it is preferred to have bubbles 130 appear to retain the original shape of the bubble as defined by the artist. As the bubbles grow, rather than expanding a rectangular area around the bubble that includes some of the background image. This process is accomplished by having everything outside the bubble shape (plus an optional drop shadow) be transparent. This method is preferable to including part of the background image in the area around the bubble and growing that extra part of the background image along with the bubble.

Although the process of outlining or masking-out irregular bubble shapes can be difficult and time consuming, the present invention provides a technique that automates most of the work of creating these sequences of carefully crafted bubble shapes, as described below.

Producing comic book bubble images for use in bubble expansion animations discussed herein originally required a painstaking process by an artist using image editing software, such as Photoshop™, to extract the bubble from the original artwork to its own separate transparent layer. Although specific and general references are made in this discussion to references Photoshop™, those skilled in the art understand that other image editing software can be used in the methods described herein.

In order to scale the process scale for thousands of comics, the process is necessarily automated. While still requiring a human to identify the location of bubbles on the page, a process was developed that can be used within Photoshop™ (or other software with similar image editing tools) to make it much easier for a human editor to create bubble images required in the format required by the reader application.

In one embodiment, the process consists of a series of photo editor "actions" that are recorded in sequence to capture bubble image rectangles and specify pivot points per bubble. The process also automates creation of transparency around the bubble and adds an enhanced shadow to make the bubble stand out better when expanded on the device. The output of this process yields both bubble images and pivot points, specified by an XML file per processed page. These XML files are accumulated and packaged into the final digital comic book file along with its original image content. The reader application, that operates to display the comic book on the device, extracts the bubble meta-data to expand bubbles as described above.

Figure 5:
FIG. 5 depicts a flattened, high resolution illustration that contains a speech bubble.
Figure 6:
FIG. 6 illustrates the selection of a dialog bubble in an image editor.

As shown in FIG. 5, an exemplary process begins with a flattened, high resolution illustration 200 that contains a speech bubble 210. Many image editing software packages have tools that enable one to make a one click section of objects. In Photoshop™ it is known as The Magic Wand Tool. As shown in FIG. 6, to select the bubble 210, the user taps to any non-text area, e.g., 220, within bubble 210. This selection includes the bubbles surrounding cloud and text makes a continuous selection using similar color values. In the illustration shown in FIG. 6, the bubble 210 background color is white. The line and stroke (outline border) helps define the shape of the speech bubble.

Figure 7:
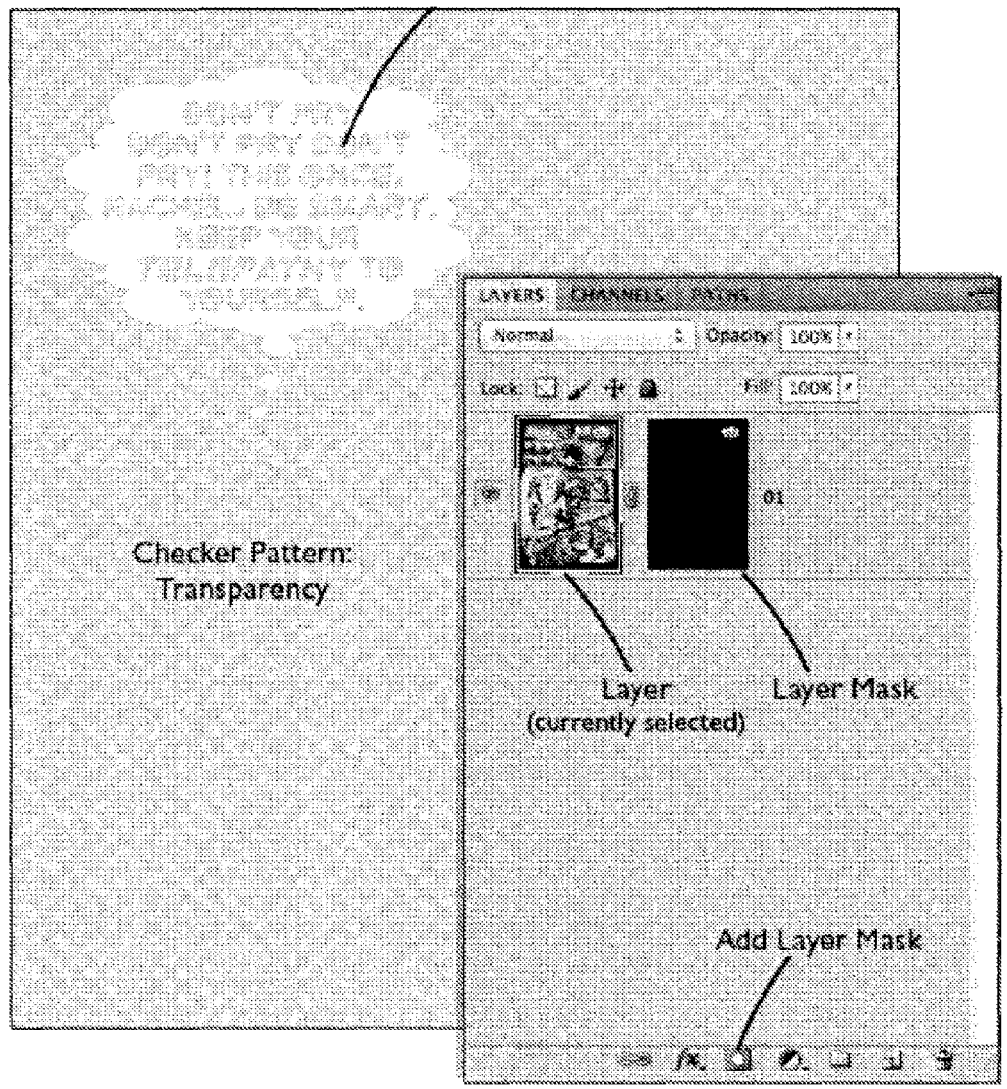
FIG. 7 depicts the creation of a layer mask from the selected speech bubble object.
Figure 8:
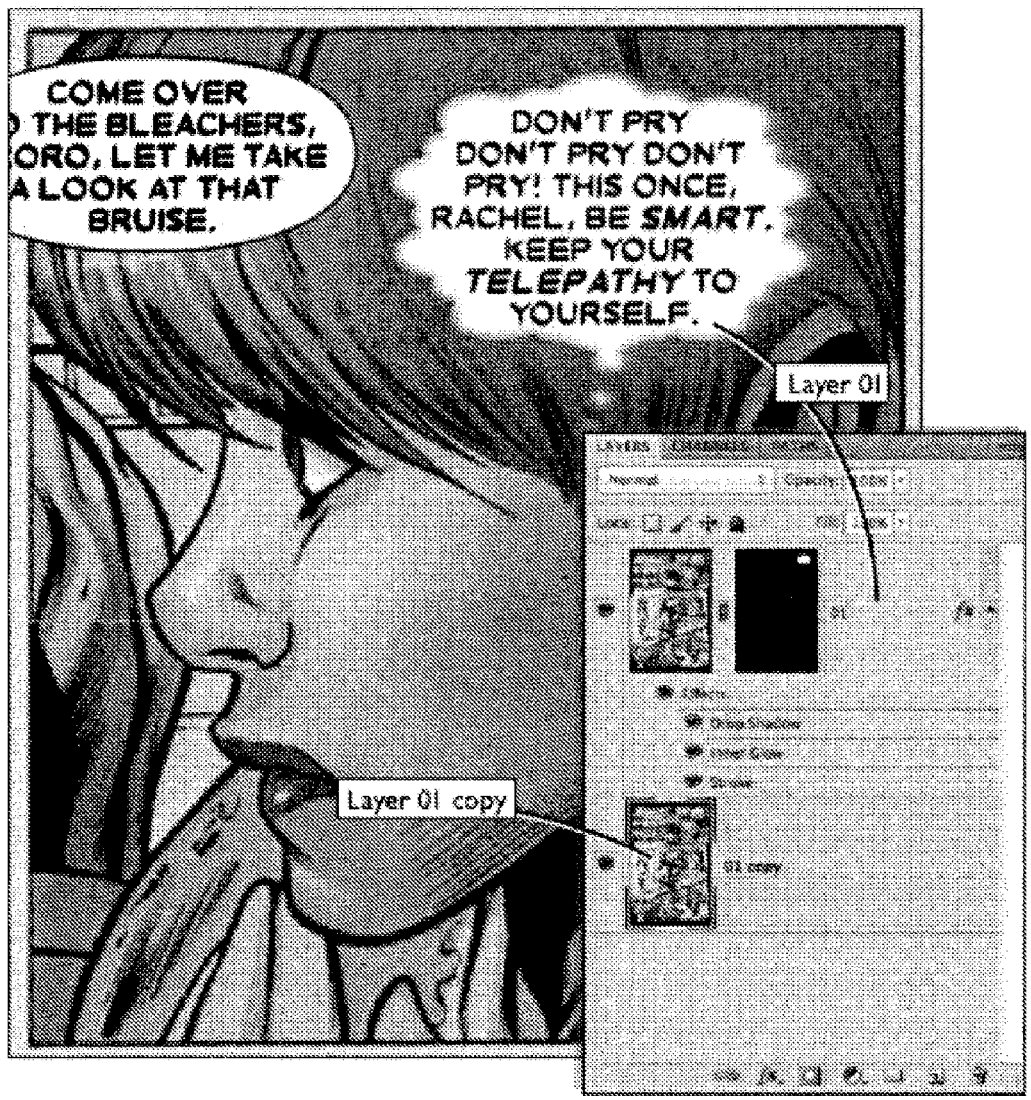
FIG. 8 depicts a speech bubble with layer style effect above layer copy.

FIG. 7 depicts the creation of a layer mask from the selected speech bubble object. The layer mask is used to block out (blacken) everything on the layer (the page) except for the speech bubble 220. In the next step in the process, the outside speech bubble shape is selected. In this process, only the speech bubble outline shape is selected, not the text. Next, the selection, i.e., the bubble, is filled to an inverted color (white in this case) to knock out the text. The system switches hack to the layer mode and the speech bubble shape and text are formed as a separate layer with layer mask. In a preferred embodiment, the black stroke (outline border) from the original illustration is not preserved. However, the system allows the user to customize the border. For example, the user can apply a layer style such as a blue stroke outlined border and apply a Drop shadow/Glow for depth. The new layer containing the stylized bubble is created via a Copy command and is created above the original parent layer. FIG. 8 illustrates the speech bubble with layer style effect, now a separate layer, displayed above parent layer and the combination of the two layers can be used to start the process again for another bubble.

The following describes the process for exporting layers and layer coordinates to XML. Two scripts are executed to export two XML tiles that define bubble image file name, bubble index (number in sequence), bubble top-left coordinate and custom pivot point. The first script is called Export Layers to File and exports all layers to a separate output file (such as .png format) to a desired location. The second script is called Export Layer Coordinates to XML and exports layer information to an XML like Stack/Layer Order which is used for the sequence order of the speech bubble, Position/XY Coordinates in combination with layerwidth & layerheight is used for the location of the layer on the screen.

Below is a portion of XML produced per layer (bubble) per comic book page. The layer element contains a number of attributes that provide information needed by the rendering application. The stack element specifies bubble Layer Order. The position attribute specifies the bubble's top-left XY coordinate on the page in pixels. The layerwidth and layerheight attributes specify the size of the bubble image captured in pixels.

<layer name="O1" stack="8" position="35, 62" layerwidth="202" layerheight="177" transformpoint="center">O1.png</layer>

Figure 9:
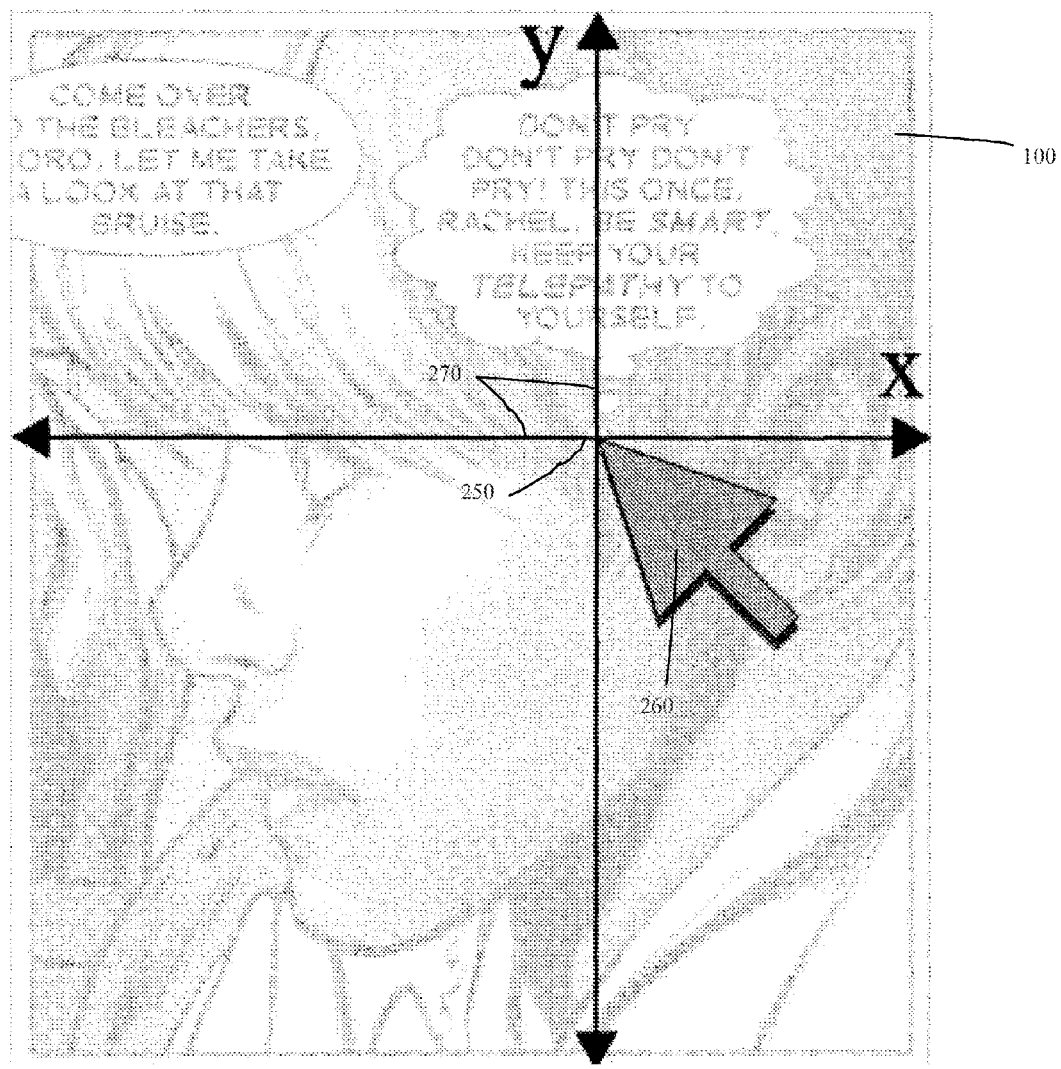
FIG. 9 illustrates the identification of a custom pivot point.
Figure 10:
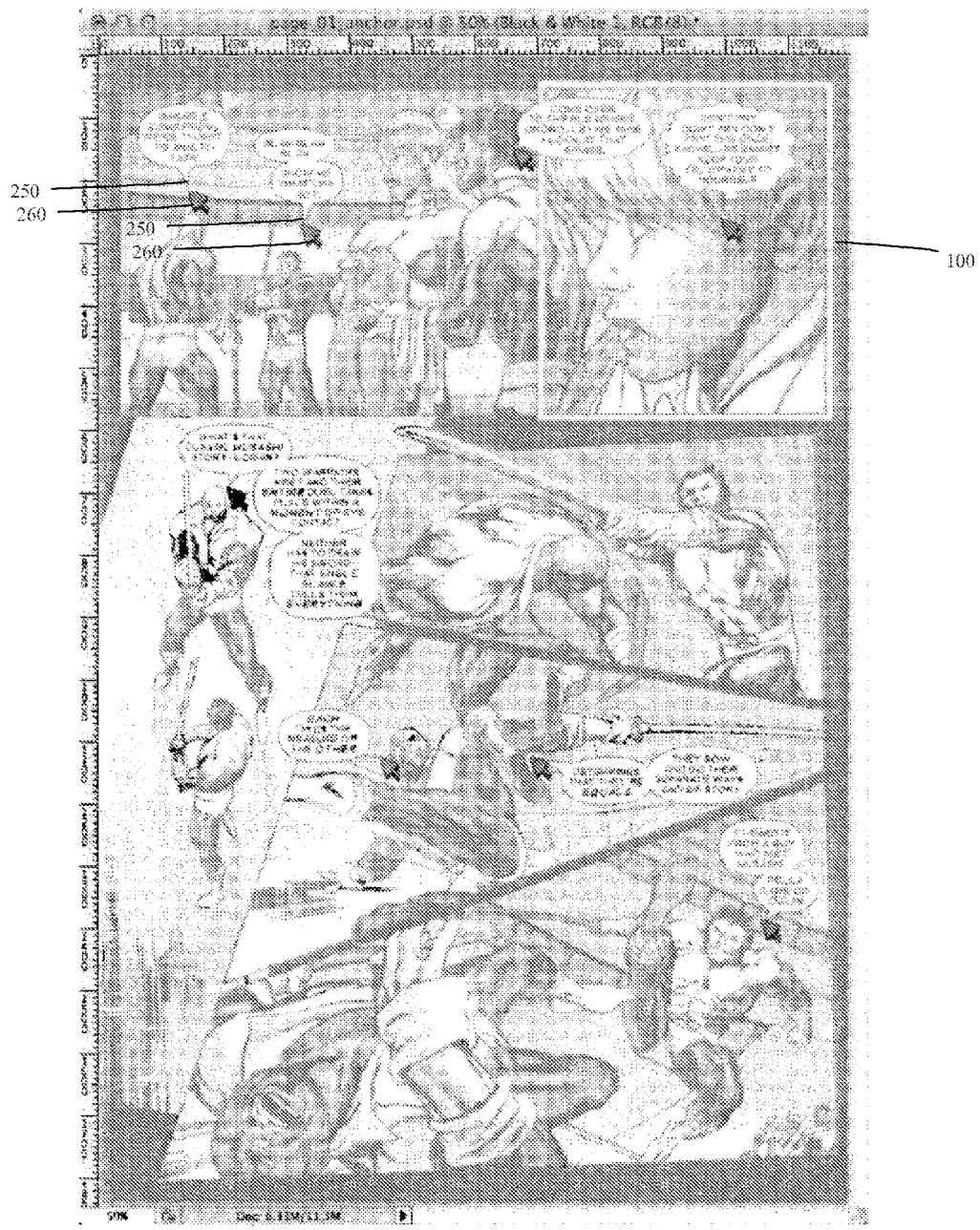
FIG. 10 illustrates an example of cursor arrows defining custom pivot points.

The following explains how a custom pivot point is defined. It was previously discussed that imaging edition software, such as Photoshop™, by default, creates a centered transform point for objects. To keep bubbles out of character faces, the present invention specifies custom pivot points 250 for each bubble. To accomplish this, as shown in FIG. 9, a large arrow 260 or a cross hair 270, or any shape, is positioned to identify the custom pivot point. A second XML file is produced containing these custom pivot points 250. In this file, the position attribute specifies the custom pivot point coordinate on the page in pixels. Layerwidth and layerheight attributes are not used here. FIG. 10 illustrates an example of cursor arrows 260 defining custom pivot points 250 in Photoshop for an entire page 100 in an electronic comic book.

Figure 11:
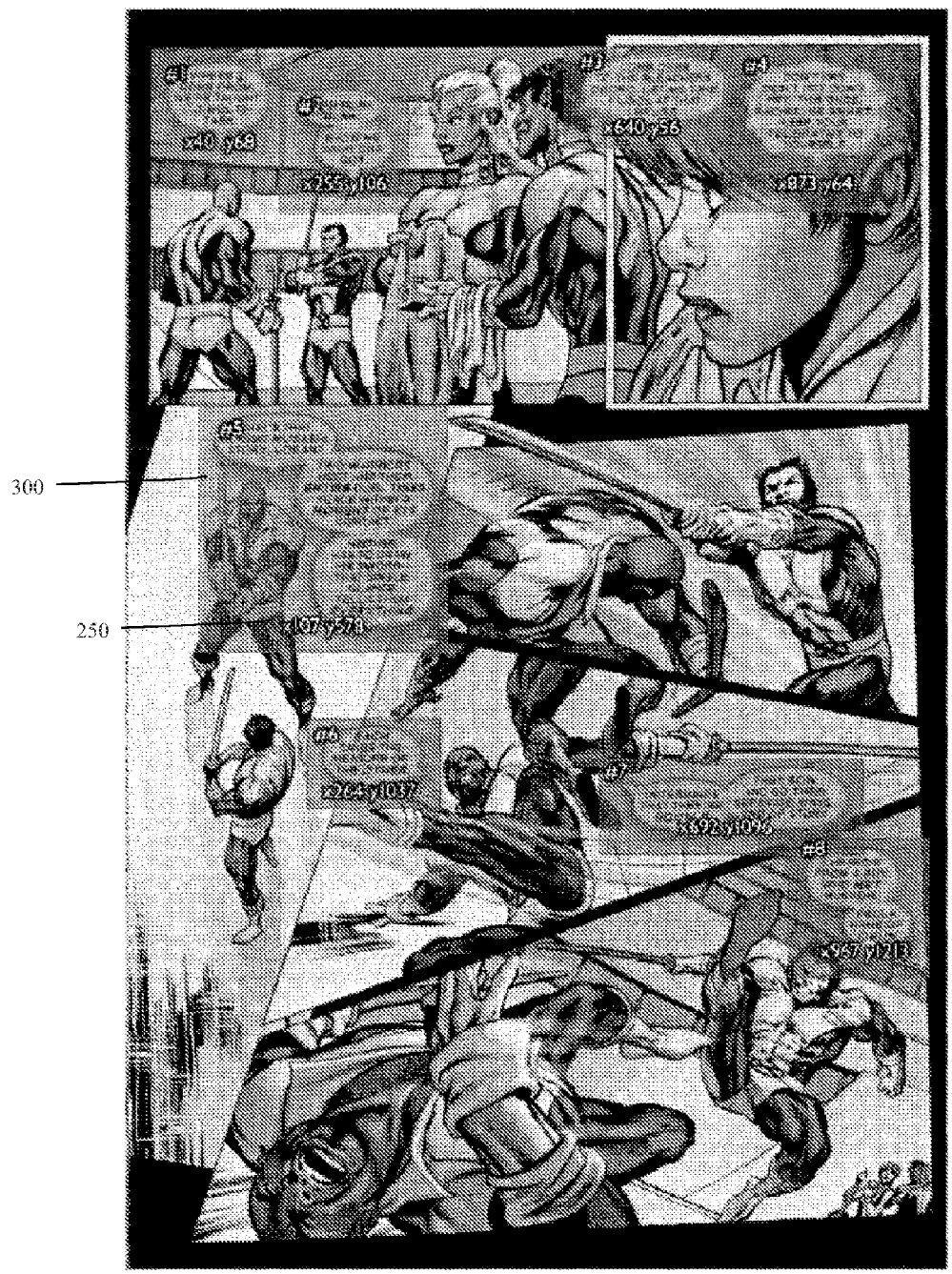
FIG. 11 depicts the definition of regions that enclose bubbles.

As shown in FIG. 11, a human editor works page-by-page defining regions that enclose bubbles. The editor can use selection tools in the imaging editor (e.g., Magic Wand tool in Photoshop™) to select bubble boundaries. The process automatically generates the rectangles 300 shown in FIG. 11. Transparent regions around bubbles and shadows are also generated automatically. The editor also specifies pivot points 250 during the process.

Figure 12:
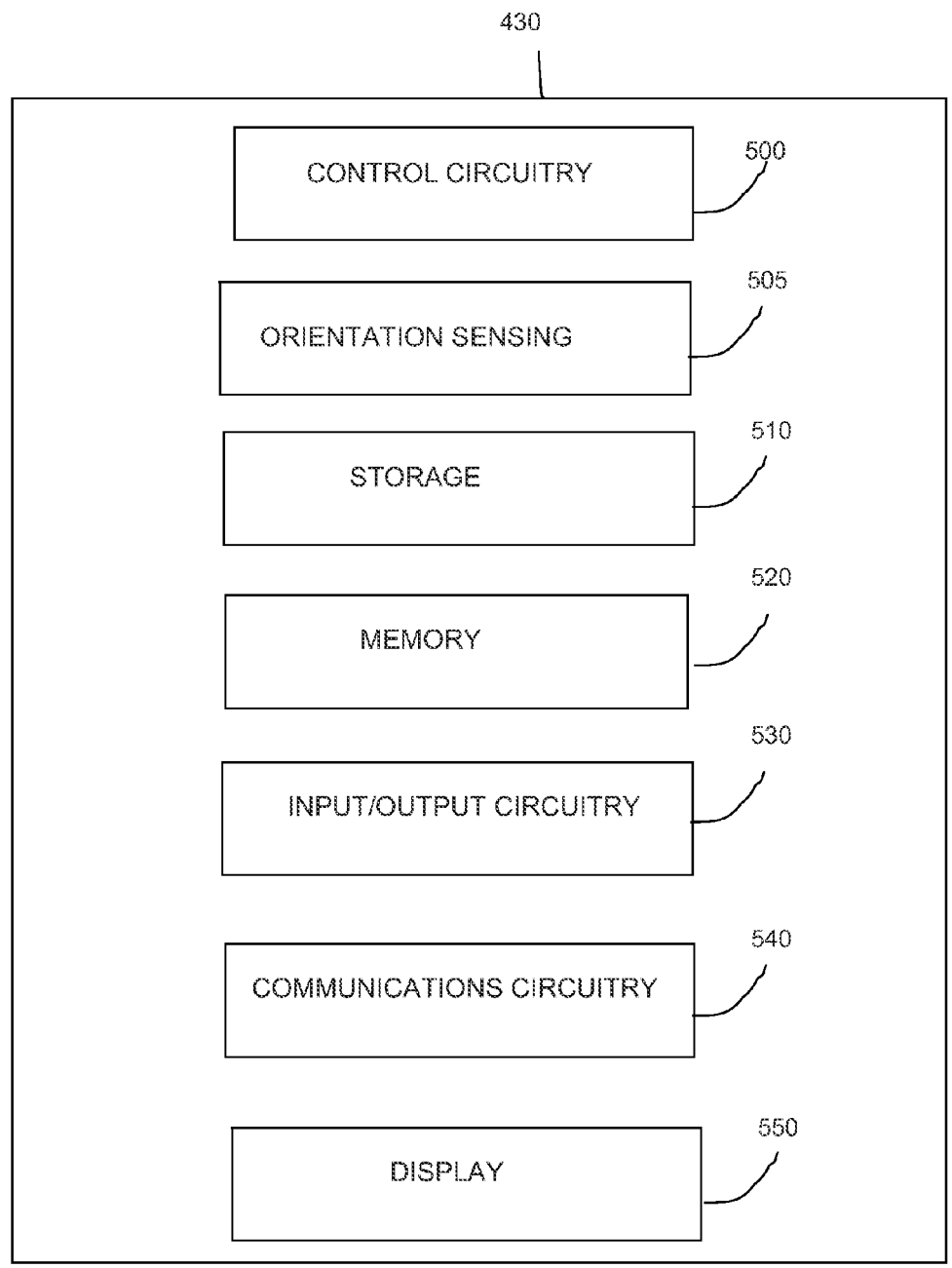
FIG. 12 illustrates the components of an exemplary device.

FIG. 12 illustrates an exemplary device 430 on which the comic book features of the present invention operate. As appreciated by those skilled the art, the device 430 can take many forms capable of operating the present invention. As previously described, in a preferred embodiment the device 430 is a mobile electronic device, and in an even more preferred embodiment device 430 is an electronic reader device. Electronic device 430 can include control circuitry 500, storage 510, memory 520, input/output ("I/O") circuitry 530, communications circuitry 540, and display 550. In some embodiments, one or more of the components of electronic device 430 can be combined or omitted, e.g., storage 510 and memory 520 may be combined. As appreciated by those skilled in the art, electronic device 430 can include other components not combined or included in those shown in this Figure, e.g., a power supply such as a battery, an input mechanism, etc.

Electronic device 430 can include any suitable type of electronic device. For example, electronic device 430 can include a portable electronic device that the user may hold in his or her hand, such as a digital media player, a personal e-mail device, a personal data assistant ("PDA"), a cellular telephone, a handheld gaming device, a tablet device or an eBook reader. As another example, electronic device 130 can include a larger portable electronic device, such as a laptop computer. As yet another example, electronic device 430 can include a substantially fixed electronic device, such as a desktop computer.

Control circuitry 500 can include any processing circuitry or processor operative to control the operations and performance of electronic device 430. For example, control circuitry 500 can be used to run operating system applications, firmware applications, media playback applications, media editing applications, or any other application. Control circuitry 500 can drive the display 550 and process inputs received from a user interface, e.g., the display 550 if it is a touch screen.

Orientation sensing component 505 includes orientation hardware such as, but not limited to, an accelerometer or a gyroscopic device and the software operable to communicate the sensed orientation to the control circuitry 500. The orientation sensing component 505 is coupled to control circuitry 500 that controls the various input and output to and from the other various components. The orientation sensing component 505 is configured to sense the current orientation of the portable mobile device 430 as a whole. The orientation data is then fed to the control circuitry 500 which control an orientation sensing application. The orientation sensing application controls the graphical user interface (GUI), which drives the display 550 to present the GUI for the desired mode.

Storage 510 can include, for example, one or more computer readable storage mediums including a hard-drive, solid state drive, flash memory, permanent memory such as ROM, magnetic, optical, semiconductor, paper, any other suitable type of storage component, or any combination thereof. Storage 510 can store, for example, media content, e.g., eBooks, widgets, music and video files, application data, e.g., software for implementing functions on electronic device 430, firmware, user preference information data, e.g., content preferences, authentication information, e.g. libraries of data associated with authorized users, transaction information data, e.g., information such as credit card information, wireless connection information data, e.g., information that can enable electronic device 130 to establish a wireless connection), subscription information data, e.g., information that keeps track of podcasts or television shows or other media a user subscribes to, contact information data, e.g., telephone numbers and e-mail addresses, calendar information data, and any other suitable data or any combination thereof. The instructions for implementing the functions of the present invention may, as non-limiting examples, comprise software and/or scripts stored in the computer-readable media 510.

Memory 520 can include cache memory, semi-permanent memory such as RAM, and/or one or more different types of memory used for temporarily storing data. In some embodiments, memory 520 can also be used for storing data used to operate electronic device applications, or any other type of data that can be stored in storage 510. In some embodiments, memory 520 and storage 510 can be combined as a single storage medium.

I/O circuitry 530 can be operative to convert, and encode/decode, if necessary analog signals and other signals into digital data. In some embodiments, I/O circuitry 530 can also convert digital data into any other type of signal, and vice-versa. For example, I/O circuitry 530 can receive and convert physical contact inputs, e.g., from a multi-touch screen, i.e., display 550, physical movements, e.g., from a mouse or sensor, analog audio signals, e.g., from a microphone, or any other input. The digital data can be provided to and received from control circuitry 500, storage 510, and memory 520, or any other component of electronic device 430. Although I/O circuitry 530 is illustrated in this Figure as a single component of electronic device 130, several instances of I/O circuitry 530 can be included in electronic device 430.

Electronic device 430 can include any suitable interface or component for allowing a user to provide inputs to I/O circuitry 530. For example, electronic device 430 can include any suitable input mechanism, such as a button, keypad, dial, a click wheel, or a touch screen, e.g., display 550. In some embodiments, electronic device 430 can include a capacitive sensing mechanism, or a multi-touch capacitive sensing mechanism.

In some embodiments, electronic device 430 can include specialized output circuitry associated with output devices such as, for example, one or more audio outputs. The audio output can include one or more speakers, e.g., mono or stereo speakers, built into electronic device 430, or an audio component that is remotely coupled to electronic device 430, e.g., a headset, headphones or earbuds that can be coupled to device 430 with a wire or wirelessly.

Display 550 includes the display and display circuitry for providing a display visible to the user. For example, the display circuitry can include a screen, e.g., an LCD screen, which is incorporated in electronic device 430. In some embodiments, the display circuitry can include a coder/decoder (Codec) to convert digital media data into analog signals. For example, the display circuitry or other appropriate circuitry within electronic device 430 can include video Codecs, audio Codecs, or any other suitable type of Codec.

The display circuitry also can include display driver circuitry, circuitry for driving display drivers, or both. The display circuitry can be operative to display content, e.g., media playback information, application screens for applications implemented on the electronic device 430, information regarding ongoing communications operations, information regarding incoming communications requests, or device operation screens, under the direction of control circuitry 500. Alternatively, the display circuitry can be operative to provide instructions to a remote display.

Communications circuitry 540 can include any suitable communications circuitry operative to connect to a communications network and to transmit communications, e.g., data from electronic device 430 to other devices within the communications network. Communications circuitry 540 can be operative to interface with the communications network using any suitable communications protocol such as, for example, Wi-Fi, e.g., a 802.11 protocol, Bluetooth, radio frequency systems, e.g., 900 MHz, 1.4 GHz, and 5.6 GHz communication systems, infrared, GSM, GSM plus EDGE, CDMA, quadband, and other cellular protocols, VOIP, or any other suitable protocol.

Electronic device 430 can include one more instances of communications circuitry 540 for simultaneously performing several communications operations using different communications networks, although only one is shown in FIG. 8 to avoid over complicating the drawing. For example, electronic device 430 can include a first instance of communications circuitry 540 for communicating over a cellular network, and a second instance of communications circuitry 540 for communicating over Wi-Fi or using Bluetooth. In some embodiments, the same instance of communications circuitry 540 can be operative to provide for communications over several communications networks.

In some embodiments, electronic device 430 can be coupled to a host device such as remote servers for data transfers, synching the communications device, software or firmware updates, providing performance information to a remote source, e.g., providing riding characteristics to a remote server, or performing any other suitable operation that can require electronic device 430 to be coupled to a host device. Several electronic devices 430 can be coupled to a single host device using the host device as a server. Alternatively or additionally, electronic device 430 can be coupled to several host devices, e.g., for each of the plurality of the host devices to serve as a backup for data stored in electronic device 430.

Although the present invention has been described in relation to particular embodiments thereof, many other variations and other uses will be apparent to those skilled in the art, it is preferred, therefore, that the present invention be limited not by the specific disclosure herein, but only by the gist and scope of the disclosure.

What is claimed is:

1. A method for navigating textual portions of an electronic comic book comprising:
   displaying at least a portion of a page of the electronic comic book on a touch screen of an electronic device;
   displaying a first text portion in a first bubble shape associated with a first illustration on the portion of the page, the first text portion being delineated from the first illustration by the first bubble shape;
   displaying a second text portion in a second bubble shape associated with a second illustration on the portion of the page, the second text portion being delineated from the second illustration by the bubble shape, wherein the second text portion and second bubble shape are displaced in a first direction from the first text portion and the first bubble shape;
   detecting a navigation gesture in a second direction on the screen of the electronic device, wherein the navigation gesture is offset from the first and second text portions and the first and second bubble shapes and wherein the first direction is different from the second direction;
   sequentially enlarging only the first text portion and the first bubble shape relative to the first illustration and enlarging only the second text portion and the second bubble shape relative to the second illustration, in response to the detection of the navigation gesture; and
   restoring the first text portion and the first bubble shape to their original size when enlarging the second text portion and the second bubble shape.

2. The method according to claim 1, wherein the navigation gesture is a continuous navigation gesture.

3. The method according to claim 1, further comprising:
   positioning the enlarged first text portion and first bubble shape on the portion of the page so as to not obscure significant elements of the first illustration.

4. The method according to claim 1, further comprising:
   displaying a navigation bar on the screen of the electronic device, wherein the navigation gesture is detected on the navigation bar.

5. An electronic device comprising:
   a display screen;
   a touch input surface coupled to the display screen;
   a memory that includes an electronic comic book and instructions for operating the device;
   control circuitry coupled to the memory, coupled to the touch input surface and coupled to the display screen, the control circuitry capable of executing the instructions and is operable to at least:
   display at least a portion of a page of the electronic comic book on the display screen;
   display a first text portion in a first bubble shape associated with a first illustration on the portion of the page, the first text portion being delineated from the first illustration by the first bubble shape;
   display a second text portion in a second bubble shape associated with a second illustration on the portion of the page, the second text portion being delineated from the second illustration by the bubble shape, wherein the second text portion and second bubble shape are displaced in a first direction from the first text portion and the first bubble shape;
   detect a navigation gesture in a second direction on the touch input surface wherein the navigation gesture is offset from the first and second text portions and the first and second bubble shapes and wherein the first direction is different from the second direction;
   sequentially enlarge only the first text portion and the first bubble shape relative to the first illustration and enlarge only the second text portion and the second bubble shape relative to the second illustration in response to the detection of the navigation gesture; and
   restoring the first text portion and the first bubble shape to their original size when enlarging the second text portion and the second bubble shape.

6. The electronic device according to claim 5 wherein the navigation gesture is a continuous navigation gesture.

7. The electronic device according to claim 5, wherein the control circuitry is further operable to execute the instructions to:
   position the enlarged first text portion and first bubble shape on the portion of the page so as to not obscure significant elements of the first illustration.

8. The electronic device according to claim 5, wherein the control circuitry is further operable to execute the instructions to:
   display a navigation bar on the display screen, wherein the navigation gesture is detected on the navigation bar.

9. A non-transitory computer-readable medium comprising a plurality of instructions that, when executed by a computer system, at least cause the computer system to:
- display at least a portion of a page of an electronic comic book on a touch screen of the computer system;
- display a first text portion in a first bubble shape associated with a first illustration on the portion of the page, the first text portion being delineated from the first illustration by the first bubble shape;
- display a second text portion in a second bubble shape associated with a second illustration on the portion of the page, the second text portion being delineated from the second illustration by the bubble shape, wherein the second text portion and second bubble shape are displaced in a first direction from the first text portion and the first bubble shape;
- detect a navigation gesture in a second direction on the touch screen of the computer system wherein the navigation gesture is offset from the first and second text portions and the first and second bubble shapes and wherein the first direction is different from the second direction;
- sequentially enlarge only the first text portion and the first bubble shape relative to the first illustration and enlarge only the second text portion and the second bubble shape relative to the second illustration, in response to the detection of the navigation gesture; and
- restoring the first text portion and the first bubble shape to their original size when enlarging the second text portion and the second bubble shape.

* * * * *